(No Model.)
G. P. RUHLE.
Manure Fork.
No. 233,808. Patented Oct. 26, 1880.
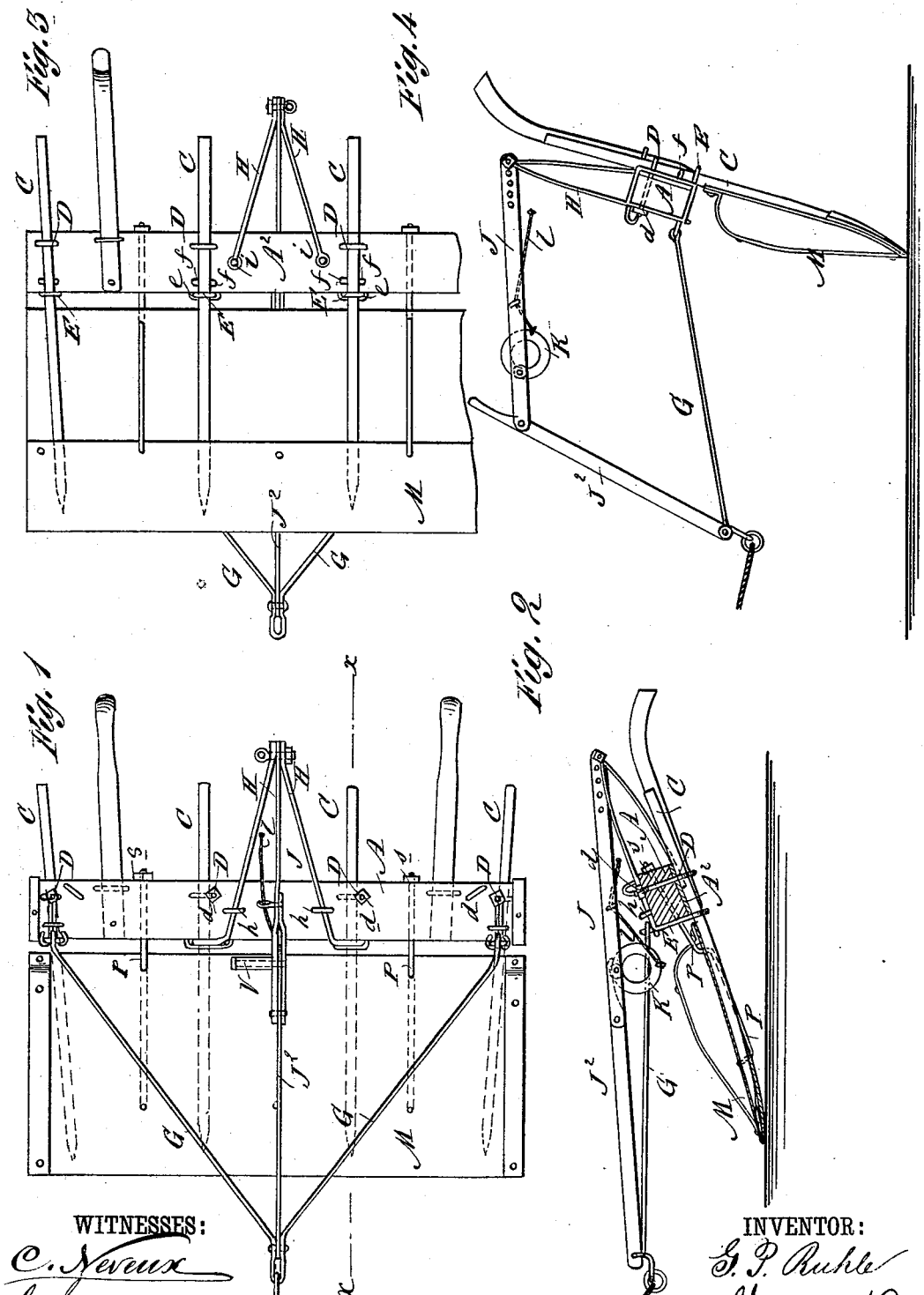
WITNESSES:
C. Neveux
C. Sedgwick
INVENTOR:
G. P. Ruhle
BY Munn & Co.
ATTORNEYS.

UNITED STATES PATENT OFFICE.

GEORGE P. RUHLE, OF SWENGEL, PENNSYLVANIA.

MANURE-FORK.

SPECIFICATION forming part of Letters Patent No. 233,808, dated October 26, 1880.

Application filed April 12, 1880. (No model.)

*To all whom it may concern:*

Be it known that I, GEORGE P. RUHLE, of Swengel, in the county of Union and State of Pennsylvania, have invented a new and useful Improvement in Forks, of which the following is a specification.

This invention relates to certain improvements on the combined scraper and fork for which Letters Patent No. 223,390 were granted to me under date of January 6, 1880, and it has particular reference to the construction of the fork.

The accompanying drawings represent the fork with a scraper attached.

Figure 1 is a top view of the apparatus in position for use. Fig. 2 is a vertical section taken in the line $xx$ of Fig. 1. Fig. 3 is a bottom view. Fig. 4 is a side view of the apparatus in position for tilting the load.

Similar letters of reference indicate corresponding parts.

A represents the head, which is made of wood and provided with an iron plate, $A^2$, on its under side for protecting and strengthening it.

The tines C are attached to the head A by means of eyebolts D and links E. The eyebolts D pass upward through the plate $A^2$ and head A, and are fastened by nuts $d$ on their upper ends. The links E are secured to the front edge of the head A by staples $e$, driven into the wood and embracing the links. The shanks of the tines C are flattened or angular, or otherwise formed so as to prevent them from turning. Each shank passes through an eyebolt, D, and the lower end of a link, E, and has two spikes, $ff$, driven into the head, one on each side of the shank, between the eyebolt and the link. By this means the tine is held in place, so as to prevent it from turning, and provision is made for sliding it longitudinally, in order to lengthen or shorten the extent of its projection forward of the head to adjust the fork to different kinds of work. When the nuts $d$ are tightened the tines are all held rigidly in place.

To the upper ends of the two links E which are nearest the ends of the head the rear ends of two rods, G G, are attached. To the upper ends of the two links E which are nearest the center of the head the front ends of two rods, H H, are attached.

The rods G G are connected loosely with the links, so as to allow them to swing up and down; but the rods H H are bent rearward over the top of the head A, to which they are rigidly secured by staples $h\,h$, and are then doubled and bent forward again and secured to the under side of the head by bolts or pins $i\,i$.

The front ends of the two rods G G are pivoted to the front end of the draft-bar, and the rear or doubled portions of the rods H H are pivoted to the rear end of said draft-bar. Thus it will be seen that the draft is uniformly distributed between the head and the four tines, and breaking or splitting of the head is prevented.

The draft-bar is jointed in a similar manner to the one shown in my patent aforesaid; but instead of a lever for bending the joint of the toggle to tilt the load I employ a cam, K, pivoted in the fork of the arm J and engaging with the rear end of the arm $J^2$. The cam is provided with a cord, $l$, by pulling which the cam is thrown against the arm $J^2$, so as to raise it in the manner described in my patent aforesaid. The arm J is provided with a handle, V, to assist in raising it.

When the apparatus is to be used as a scraper the scraping-blade M is attached by inserting the points of the tines in sockets on the under side of the blade, and it is secured by means of rods P, running under the blade to near the rear edge, then upward through the blade, and then rearward through the head A, where the ends of the rods are secured by nuts $s$.

Having thus described my invention, I claim as new and desire to secure by Letters Patent—

The combination, with the head, the tines, and the jointed draft-bar, of the rods or braces G G and H H, as shown and described, for the purpose specified.

GEORGE P. RUHLE.

Witnesses:
JOHN L. HALFPENNY,
R. L. BOWER.